F. B. BOALT.
Hay-Press.

No. 8,733. Reissued June 3, 1879.

Witnesses: Charles Lukirk.
C. D. Paul

Francis B. Boalt
by his Att.
Alex. Lelkirk
Inventor.

N. PETERS, PHOTO-LITHOGRAPHER, WASHINGTON, D. C.

UNITED STATES PATENT OFFICE.

FRANCIS B. BOALT, OF BAINBRIDGE, NEW YORK.

IMPROVEMENT IN HAY-PRESSES.

Specification forming part of Letters Patent No. 199,021, dated January 8, 1878; Reissue No. 8,733, dated June 3, 1879; application filed December 9, 1878.

*To all whom it may concern:*

Be it known that I, FRANCIS B. BOALT, of Bainbridge, in the county of Chenango and State of New York, have invented certain new and useful Improvements in Hay-Presses, which improvements are fully described in the following specification and accompanying drawings, in which—

Figure 1:
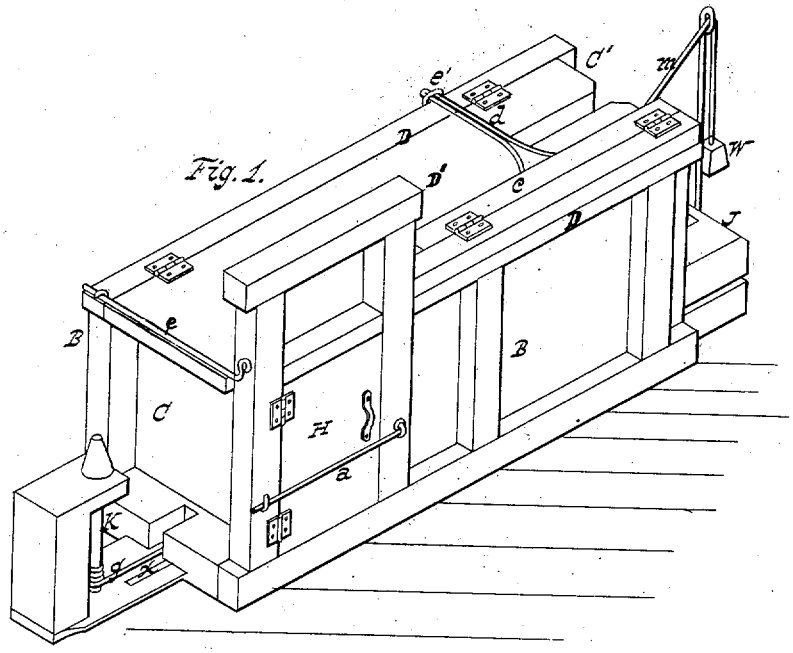
Figure 2:
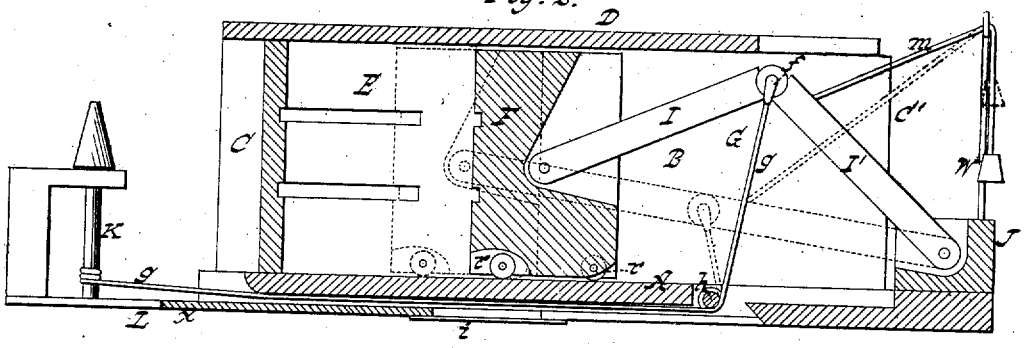

Figure 1 represents a perspective view of a hay-press embodying the improvements in my invention, and Fig. 2 represents a sectional elevation of the same.

The nature of my invention consists in the combination and arrangement of parts, hereinafter more fully described, and set forth in the claim.

In the appended drawings, A designates the bottom or bed of the press; B, the sides of the same; C, the rear end, and D D′ the top frame and top door. One of the sides B has a hinged door, H, opening outwardly near the rear end of said side. This door, when closed, is fastened by a rod or lever, *a*. The top door, D′, is hinged on the side opposite to door H to the top frame, D, of the press, and is held down at its rear end by a hinged rod or lever, *e*, extending across the same.

The chief fastening of said top door, D′, is, however, a hinged clamp-bar, *c*, attached to the top of the press on the side opposite to the hinges of said door, and closing down on the upper front part of the door. Said clamp-bar has a rod or cross-bar, *d*, which extends across the top of said door D′ when the latter is closed, and engages with a link or other catch, *e′*. The rods *a* and *e* also engage with suitable catches, whereby the fastening is complete.

F designates the follower, which is provided with anti-friction rollers *r r*, on which it moves. It may have similar rollers on its top and sides. This follower is operated by toggle-levers I I′, connected to a fixed block or post, J, outside of the press-chamber, and beyond the open end thereof. In the joint of said toggle-levers is a clevis, *f*, from which a rope or chain, *g*, passes downward through a slot in the bed or bottom A of the press, around a pulley, *h*, and to a windlass, K, at the rear end of the press. This windlass is mounted on a slide, L, which moves in a suitable dove-tailed longitudinal recess made in the bottom A, so that said slide may be pushed in or drawn out, as required. Its movement may be limited by a pin extending downward into a longitudinal slot, *x*, of the said slide L. When drawn out to its fullest extent a spring, *i*, behind its rear end holds it in place by springing against bottom A, and acting as a stop for slide L.

The door H being closed and follower F drawn back, the top piece, D′, is raised so as to open the top of the press, and the hay or other material to be baled is forced down through said top into the press-chamber E. The said top of the press is then closed and the said toggle-levers extended, which forces follower F along until the toggle-levers are straight. The pressing of the bale is then complete. It is then tied in the usual manner, and withdrawn through door H.

The follower is then drawn back by means of a cord, *m*, which is attached to one of the said toggle-levers, and which passes upward over a pulley, or through a loop that may be mounted on or formed in the top of a post connected to the press, or in a beam or rafter overhead, said rope having a weight, W, attached to its other end. This weight should balance the follower F, so that very little power will be required to withdraw the latter. When toggles I I′ are straightened, they incline forward and downward from follower F to block J.

When the press is not in use the slide L is pushed inward, so as not to take up so much room.

Having thus fully described my invention, what I claim as new, and desire to secure by Letters Patent, is—

The combination of follower F on rollers *r r* with toggle-lever I I′, clevis *f*, rope *g*, windlass K, slide L, and a spring-latch adapted to spring up behind said slide, and prevent it from being pressed in accidentally or drawn in by the strain on the windlass K.

FRANCIS B. BOALT.

Witnesses:

CHARLES B. SUMNER,
JOHN H. COONS.